3,257,158
SPLIT RIM SPECTACLE FRAME WITH SCREW MEANS FOR HOLDING SPLIT PORTIONS AND FOR SECURING HINGE MEMBER IN HINGE SLOT
Frederick D. Cornford and Norman J. Radziwon, Rochester, N.Y., assignors to Bausch & Lomb Incorporated, Rochester, N.Y., a corporation of New York
Filed Dec. 20, 1962, Ser. No. 246,221
1 Claim. (Cl. 351—90)

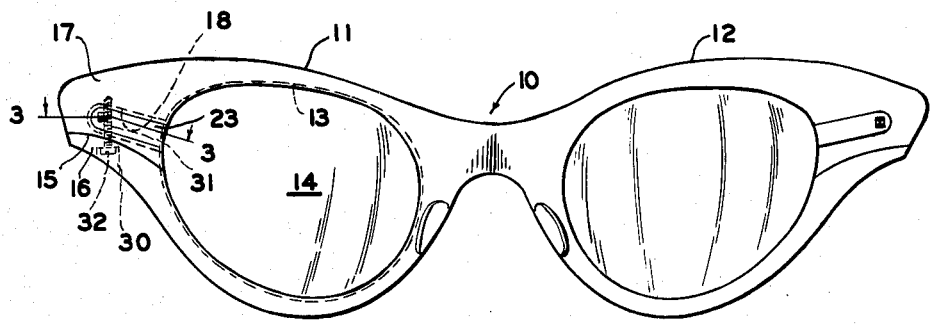
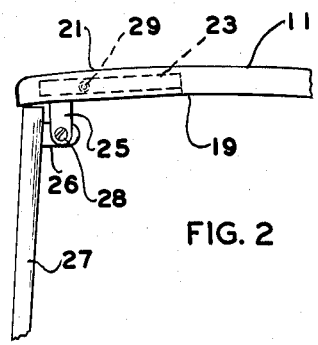
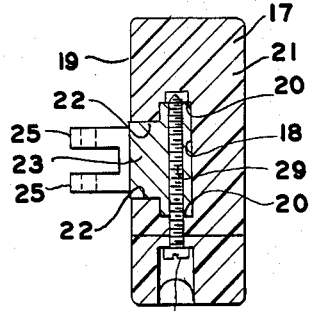
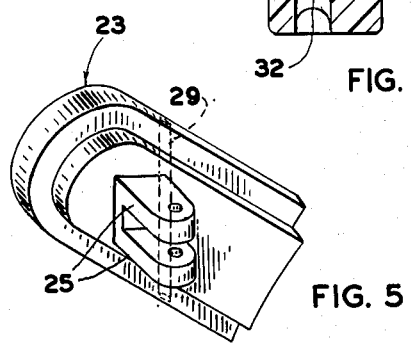
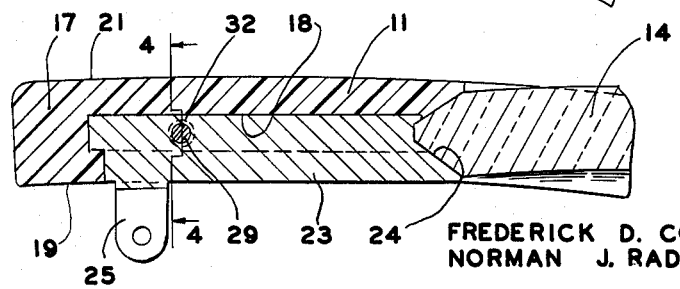
June 21, 1966  F. D. CORNFORD ETAL  3,257,158
SPLIT RIM SPECTACLE FRAME WITH SCREW MEANS FOR
HOLDING SPLIT PORTIONS AND FOR SECURING
HINGE MEMBER IN HINGE SLOT
Filed Dec. 20, 1962
FIG. 1
FIG. 2
FIG. 4
FIG. 5
FIG. 3
FREDERICK D. CORNFORD
NORMAN J. RADZIWON
INVENTORS
BY Frank C. Parker
ATTORNEY

The present invention relates generally to spectacle frames and more particularly to an improved means for joining together a split frame rim and simultaneously rigidly mounting a temple hinge member in the temple region of a spectacle frame without the necessity of providing a rivet projecting through the front of the frame.

It is a primary object of the present invention to provide means enabling the use of a single fastening screw for simultaneously connecting the split ends of a spectacle frame and holding a temple mounting hinge in rigid assembly with the frame.

More particularly the present invention utilizes a temple mounting hinge member of T-shaped cross-section disposed in a complementary T-shaped slot formed in the temple region of the spectacle frame with a single screw extending through lateral openings formed in the split ends of the spectacle frame and into a threaded opening in the hinge member in order to hold the hinge member in place in the slot and to retain the split frame ends together.

Other objects as well as advantages of the present invention will become apparent from the following detailed description when read in conjunction with the appended drawing, wherein:

FIG. 1 represents a plan view of the rear side of a spectacle frame embodying the invention;

FIG. 2 is a fragmentary top view of a portion of the spectacle frame of FIG. 1;

FIG. 3 is a detailed sectional view taken substantially along the line 3—3 in FIG. 1 and looking in the direction of the arrows;

FIG. 4 is a detailed sectional view taken substantially along the line 4—4 in FIG. 3 and looking in the direction of the arrows; and FIG. 5 is a detailed perspective view of a T-shaped hinge member utilized in the present invention.

With reference now to the drawing wherein like reference numerals have been used in the different views to identify identical parts, a spectacle frame is represented generally by reference numeral 10 and comprises left and right frame rim portions 11 and 12 each of which is formed with a peripheral inwardly opening groove 13 for facilitating mounting an ophthalmic lens 14 therein. The spectacle frame 10 is preferably relatively massive and formed of metal such as aluminum but could be made of other metals or plastic, if desired.

The frame rims 11 and 12 are split as indicated at 15 and thereby provide frame rim ends 16 and 17 which may be conveniently spread apart to assist in mounting the lenses 14 in the frame openings.

The frame rim ends 17 are each formed with a radially outwardly and upwardly extending notch or slot 18 which opens toward the rear or back side 19 of the frame 10. The slot 18 is substantially T-shaped in cross-section with the widest portion of the slot, as represented by reference numeral 20, being disposed substantially midway between the back 19 and front 21 of the frame. The narrow portion 22 of the slot 18 opens to the back or rear side 19 of the frame.

A temple hinge mounting member or temple hinge member 23 of T-shaped cross-section which is complementary in shape to slot 18, is received within slot 18, the narrow portion 22 of the slot 18 being effective to prevent the member 23 from coming out the rear surface 19 of the frame. The member 23 is grooved, as at 24, on the inner end to conform to the edge of the ophthalmic lens 14. The member 23 is formed with hinge portions 25 with which hinge portions 26 secured to temples 27 are connected by hinge pins or screws 28.

The member 23 is formed with a threaded opening or hole 29 and when the member 23 is seated in slot 18, the hole 29 is in alignment with holes 30 and 31 respectively formed in frame ends 16 and 17. A connecting screw 32 is set into holes 30 and 31 and threaded into the threaded opening 29 and is thus effective to retain the frame ends 16 and 17 together and to hold the member 23 in slot 18. Thus, but a single screw is needed for holding the frame ends together and simultaneously holding hinge members 23 in slot 18. Consequently a rigid construction for the temple mounting is provided without the necessity for rivets or other means projecting through the frame 11 from the back to the front surfaces thereof.

It is contemplated that changes and modifications may be made in the present invention without departing from the spirit or scope thereof.

What is claimed is:

In spectacles charcterized by a massive frame having openings defined by peripheral rims formed with rim grooves therearound for receiving and holding ophthalmic lenses therein, said frame rims being split in the temple regions thereof to enable spreading the rims for facilitating insertion of the ophthalmic lenses into the openings, means in said frame rim temple regions defining hinge slots disposed above the splits in the temple regions, said slots being of T-shaped cross-section opening to the rear of the spectacles and having the widest portions of the slots disposed substantially midway between the front and rear surfaces of said frame, said hinge slots each having a closed outer end and opening at the other end into the respective rim groove, hinge members disposed in said hinge slots in the temple regions of said frame for enabling hinged attachment of a pair of temples to said frame, each of said hinge members being T-shaped in cross-section and complementary to said T-shaped slots and said hinge members each defining a grooved inner edge disposed in alignment with the respective rim groove, said T-shaped hinge slots slidably receiving said T-shaped hinge members therein, said hinge members each having a transverse threaded opening therein, means defining aligned openings extending across the splits in the frame members, and screw means respectively extending through said ailgned openings and into the transverse threaded openings of said hinge members for simultaneously holding together the split portions of said frame rims and retaining said T-shaped hinge members rigidly within the complementary slots.

References Cited by the Examiner

UNITED STATES PATENTS

| 1,582,898 | 5/1926 | Bobrow. | |
| 2,329,100 | 9/1943 | Chappell | 351—93 |
| 2,452,159 | 10/1948 | Small | 351—86 |
| 3,034,401 | 5/1962 | Radziwon | 351—52 |
| 3,060,803 | 10/1962 | McCulloch et al. | 351—102 |

FOREIGN PATENTS

| 870,078 | 12/1941 | France. |
| 930,594 | 7/1955 | Germany. |

DAVID H. RUBIN, *Primary Examiner.*